(12) United States Patent
Kadowaki et al.

(10) Patent No.: US 7,181,749 B2
(45) Date of Patent: Feb. 20, 2007

(54) FLUTTER-REDUCING DISK DEVICE

(75) Inventors: Takeshi Kadowaki, Tokorozawa (JP);
Katsuyuki Kobayashi, Tokorozawa (JP); Youichi Konno, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 252 days.

(21) Appl. No.: 10/711,944

(22) Filed: Oct. 14, 2004

(65) Prior Publication Data

US 2005/0097581 A1    May 5, 2005

(30) Foreign Application Priority Data

Oct. 31, 2003    (JP) ............................. 2003-372326

(51) Int. Cl.
*G11B 17/03*    (2006.01)
*G11B 33/00*    (2006.01)

(52) U.S. Cl. ...................................... 720/601; 720/653
(58) Field of Classification Search ................ 720/601, 720/653
See application file for complete search history.

(56) References Cited

U.S. PATENT DOCUMENTS

| | | | | |
|---|---|---|---|---|
| 5,181,197 A | * | 1/1993 | Sugie et al. ................ | 720/601 |
| 5,978,341 A | * | 11/1999 | Jeong ......................... | 720/717 |
| 6,212,147 B1 | * | 4/2001 | Ishihara ...................... | 720/612 |
| 6,910,218 B2 | * | 6/2005 | Park et al. .................. | 720/653 |
| 2001/0026520 A1 | * | 10/2001 | Watanabe et al. .......... | 369/75.2 |
| 2005/0237892 A1 | * | 10/2005 | Kuo et al. ............... | 369/75.21 |

FOREIGN PATENT DOCUMENTS

| | | |
|---|---|---|
| JP | 11-232866 | 8/1999 |
| JP | 2001-338482 | 12/2001 |

* cited by examiner

*Primary Examiner*—Brian E. Miller
(74) *Attorney, Agent, or Firm*—Armstrong, Kratz, Quintos, Hanson & Brooks, LLP (57) ABSTRACT

A recess (16*a*3) is provided to be continuous with the circumferential edge of a tray recess (16*a*2) of a disk tray (16) housing an optical disc (28) to allow a pickup (45) to move without contacting anything. A cover section (17*c*) having a substantially tongue-like shape adapted to the recess (16*a*3) is projected integrally from a rotor support member (17) covering the tray recess (16*a*2) from above and defining a substantially cylindrical housing space (18) for coaxially housing the optical disc (28), the cover section continuously covering the recess (16*a*3) of the disk tray (16) and the housing space (18). Even when the optical disc (28) is rotated at a high speed, flutter attributable to airflow or a difference between pressures on both sides of the optical disc (28) can be reduced to allow the optical disc (28) to rotate with stability.

10 Claims, 11 Drawing Sheets

| | | 6500rpm | | 6550rpm | | 6600rpm | | 6650rpm | | 6700rpm | | 6750rpm | | 6800rpm | | 6850rpm | | 6900rpm | | 6950rpm | | 7000rpm | | Max | |
|---|---|---|---|---|---|---|---|---|---|---|---|---|---|---|---|---|---|---|---|---|---|---|---|---|---|
| | | Tan | Rad | Tan | Rad | Tan | Rad | Tan | Rad | Tan | Rad | Tan | Rad | Tan | Rad | Tan | Rad | Tan | Rad | Tan | Rad | Tan | Rad | Tan | Rad |
| 1 | MEASURED VALUE [mm] | 5.0 | 0.0 | 7.0 | 0.0 | 10.0 | -4.0 | 2.0 | -10.0 | -4.0 | -6.0 | -4.0 | -2.0 | -3.0 | 0.0 | -3.0 | 0.0 | -2.0 | 0.0 | -2.0 | 0.0 | -2.0 | 0.0 | 10.0 | -10.0 |
| | CALCULATED VALUE [°] | 0.05 | 0.00 | 0.08 | 0.00 | 0.11 | -0.04 | 0.02 | -0.11 | -0.04 | -0.07 | -0.04 | -0.02 | -0.03 | 0.00 | -0.03 | 0.00 | -0.02 | 0.00 | -0.02 | 0.00 | -0.02 | 0.00 | 0.11 | -0.11 |
| 2 | MEASURED VALUE [mm] | 2.0 | 2.0 | 3.0 | 2.0 | 4.0 | 1.0 | 4.0 | -2.0 | 0.0 | -3.0 | 0.0 | 0.0 | 0.0 | 0.0 | 0.0 | 0.0 | 0.0 | 0.0 | 0.0 | 0.0 | 0.0 | 0.0 | 4.0 | -3.0 |
| | CALCULATED VALUE [°] | 0.02 | 0.02 | 0.03 | 0.02 | 0.04 | 0.01 | 0.04 | -0.02 | 0.00 | -0.03 | 0.00 | 0.00 | 0.00 | 0.00 | 0.00 | 0.00 | 0.00 | 0.00 | 0.00 | 0.00 | 0.00 | 0.00 | 0.04 | -0.03 |
| 3 | MEASURED VALUE [mm] | -1.0 | 0.0 | -1.0 | 1.0 | -2.0 | 2.0 | 0.0 | 4.0 | 2.0 | 3.0 | 2.0 | 1.0 | 2.0 | 0.0 | 1.0 | 0.0 | 0.0 | 0.0 | 0.0 | 0.0 | 0.0 | 0.0 | 2.0 | 4.0 |
| | CALCULATED VALUE [°] | -0.01 | 0.00 | -0.01 | 0.01 | -0.02 | 0.02 | 0.00 | 0.04 | 0.02 | 0.03 | 0.02 | 0.01 | 0.02 | 0.00 | 0.01 | 0.00 | 0.00 | 0.00 | 0.00 | 0.00 | 0.00 | 0.00 | 0.02 | 0.04 |
| 4 | MEASURED VALUE [mm] | 2.0 | 0.0 | 3.0 | 0.0 | 5.0 | 1.0 | 8.0 | 0.0 | 10.0 | -10.0 | -8.0 | -8.0 | -3.0 | -7.0 | -5.0 | -5.0 | -2.0 | -3.0 | -2.0 | -3.0 | -2.0 | -2.0 | 10.0 | -10.0 |
| | CALCULATED VALUE [°] | 0.02 | 0.00 | 0.03 | 0.00 | 0.05 | 0.01 | 0.09 | 0.00 | 0.11 | -0.11 | -0.09 | -0.09 | -0.03 | -0.08 | -0.05 | -0.05 | -0.02 | -0.03 | -0.02 | -0.03 | -0.02 | -0.02 | 0.11 | -0.11 |
| 5 | MEASURED VALUE [mm] | -3.0 | 0.0 | -5.0 | 0.0 | -7.0 | 0.0 | -10.0 | 4.0 | -7.0 | 12.0 | 3.0 | 8.0 | 3.0 | 5.0 | 3.0 | 3.0 | 2.0 | 2.0 | 2.0 | 2.0 | 2.0 | 2.0 | -10.0 | 12.0 |
| | CALCULATED VALUE [°] | -0.03 | 0.00 | -0.05 | 0.00 | -0.08 | 0.00 | -0.11 | 0.04 | -0.08 | 0.13 | 0.03 | 0.09 | 0.03 | 0.05 | 0.03 | 0.03 | 0.02 | 0.02 | 0.02 | 0.02 | 0.02 | 0.02 | -0.11 | 0.13 |
| 6 | MEASURED VALUE [mm] | 0.0 | 2.0 | 1.0 | 2.0 | 2.0 | 2.0 | 3.0 | 1.0 | 4.0 | -2.0 | 1.0 | -2.0 | 0.0 | -1.0 | 0.0 | 0.0 | 0.0 | 0.0 | 0.0 | 0.0 | 0.0 | 0.0 | 4.0 | -2.0 |
| | CALCULATED VALUE [°] | 0.00 | 0.02 | 0.01 | 0.02 | 0.02 | 0.02 | 0.03 | 0.01 | 0.04 | -0.02 | 0.01 | -0.02 | 0.00 | -0.01 | 0.00 | 0.00 | 0.00 | 0.00 | 0.00 | 0.00 | 0.00 | 0.00 | 0.04 | -0.02 |
| 7 | MEASURED VALUE [mm] | 3.0 | 2.0 | 3.0 | 3.0 | 7.0 | 0.0 | 2.0 | -2.0 | 0.0 | 0.0 | 0.0 | 0.0 | 0.0 | 0.0 | 0.0 | 0.0 | 0.0 | 0.0 | 0.0 | 0.0 | 0.0 | 0.0 | 7.0 | 3.0 |
| | CALCULATED VALUE [°] | 0.03 | 0.02 | 0.03 | 0.03 | 0.08 | 0.00 | 0.02 | -0.02 | 0.00 | 0.00 | 0.00 | 0.00 | 0.00 | 0.00 | 0.00 | 0.00 | 0.00 | 0.00 | 0.00 | 0.00 | 0.00 | 0.00 | 0.08 | 0.03 |
| 8 | MEASURED VALUE [mm] | -2.0 | 1.0 | -3.0 | 3.0 | -2.0 | 3.0 | 2.0 | 3.0 | 2.0 | 3.0 | 3.0 | 3.0 | 2.0 | 2.0 | 1.0 | 0.0 | 0.0 | 0.0 | 0.0 | 0.0 | 0.0 | 0.0 | 3.0 | 3.0 |
| | CALCULATED VALUE [°] | -0.02 | 0.01 | -0.03 | 0.03 | -0.02 | 0.03 | 0.02 | 0.03 | 0.02 | 0.03 | 0.03 | 0.03 | 0.02 | 0.02 | 0.01 | 0.00 | 0.00 | 0.00 | 0.00 | 0.00 | 0.00 | 0.00 | 0.03 | 0.03 |
| C | MEASURED VALUE [mm] | 4.0 | 1.0 | 5.0 | 0.0 | 8.0 | 0.0 | 13.0 | -3.0 | 9.0 | -18.0 | -7.0 | -11.0 | -7.0 | -7.0 | -5.0 | -5.0 | -6.0 | -4.0 | -5.0 | -3.0 | -5.0 | -3.0 | 13.0 | -18.0 |
| | CALCULATED VALUE [°] | 0.04 | 0.01 | 0.05 | 0.00 | 0.09 | 0.00 | 0.14 | -0.03 | 0.10 | -0.20 | -0.08 | -0.12 | -0.08 | -0.08 | -0.05 | -0.05 | -0.07 | -0.04 | -0.05 | -0.03 | -0.05 | -0.03 | 0.14 | -0.20 |

FIG. 11

FLUTTER-REDUCING DISK DEVICE

BACKGROUND OF THE INVENTION

1. Field of the Invention

The present invention relates to a disk device that drives a disk-shaped recording medium for rotation.

2. Description of Related Art

Hitherto disk devices have been widely put into use, which write or read data on and from a disk-shaped recording medium such as a CD (Compact Disc), DVD (Digital Versatile Disc) or HD (Hard Disk) while driving the medium for rotation. It is known that flapping of a disk-shaped recording medium, which is referred to as "flutters" occurs when the disk-shaped recording medium is rotated. Under the circumstance, configurations for reducing flutter during rotation of a disk-shaped recording medium are known (for example, see Reference 1: JPHei 11-232866A, the left column of p. 3 to the right column of p. 4, and Reference 2: JP2001-338482A, the right column of p. 2 to the right column of p. 3).

In a configuration disclosed in Reference 1, a gap between an outer circumference of a disk in a magnetic disk device and an inner wall of a shroud is reduced to a predetermined distance to eliminate any difference in air pressure between the top and bottom sides of the disk and to thereby reduce the amplitude of flutter. In a configuration disclosed in Reference 2, a gap between one surface of a disk and stationary walls of a base and a cover opposing the disk surface is kept at 1 mm or less to reduce flutter generated by a difference between the pressures of airflows generated when the disk is rotated. Further, in the configuration disclosed in Reference 2, a shroud member is provided on the cover in a region of the shroud opposing an actuator chamber in the vicinity of a magnetic head to form a labyrinth between the chamber and the shroud such that an airflow which has been circulated in the actuator chamber will not flow into the vicinity of the magnetic head. Vibration of the magnetic head is thus suppressed.

Increase in rotating speed of disk-shaped recording media is proceeding in order to reduce the time required to read or record data. As a result of the increase in the rotating speed, the generation of flutter has become significant. In particular, needs for recording data in higher densities have resulted in demand for reduction of flutter.

SUMMARY OF THE INVENTION

An object of the present invention is to provide a disk device in which flutter is reduced.

A disk device according to an aspect of the present invention, includes: a tray having a flat surface portion on which a disk-shaped recording medium is substantially set; a cover which substantially covers the flat surface portion to define a housing space for housing the disk-shaped recording medium; a rotation drive section for rotating the disk-shaped recording medium; and a data processing unit for recording data on the disk-shaped recording medium or reading data recorded thereon, in which the tray has an opening for allowing the data processing unit to move along a recording surface of the disk-shaped recording medium, the opening includes an inner opening located inside the flat surface portion and an outer opening located outside the flat surface portion, and wherein the cover includes a cover section, which covers the outer opening at an interval smaller than the interval at which the cover covers the inner opening.

A disk device according to another aspect of the present invention, includes: a tray having a flat surface portion on which a disk-shaped recording medium is substantially set; a cover which substantially covers the flat surface portion to define a housing space for housing the disk-shaped recording medium; a rotation drive section for rotating the disk-shaped recording medium; and a data processing unit for recording data on the disk-shaped recording medium or reading data recorded thereon, in which the tray has an opening for allowing the data processing unit to move along a recording surface of the disk-shaped recording medium, the opening includes an inner opening located inside the flat surface portion and an outer opening located outside the flat surface portion, and the cover includes a projection projecting from a surface thereof opposing the disk-shaped recording medium housed in the housing space, the end of the projection opposing at least a part of an outer circumferential edge of the disk-shaped recording medium.

DETAILED DESCRIPTION OF PREFERRED EMBODIMENT(S)

[First Embodiment]

A first embodiment of the present invention will now be described based on the accompanying drawings. The present embodiment will be described with reference to a disk drive as an example of a disk device for recording and reading data on and from an optical disc as a disk-shaped recording medium. However, the present invention may be applied to, for example, portable disk device, reproduction and recording device having a disk drive for performing processes for recording and reproducing, for example, video data, and game machines. That is, the present invention is applicable to any type of disk device which records or reads out various data on and from any disk-shaped recording medium such as a magnetic disk and magneto-optical disc other than optical discs. Further, although the description will be made with reference to a mode of implementation in which a disk-shaped recording medium is loaded such that the plane of the medium extends in a substantially horizontal direction, the present invention accommodates modes of implementation in which the plane of a medium extends in a substantially vertical direction.

(Structure of Disk Drive)

Figure 1:
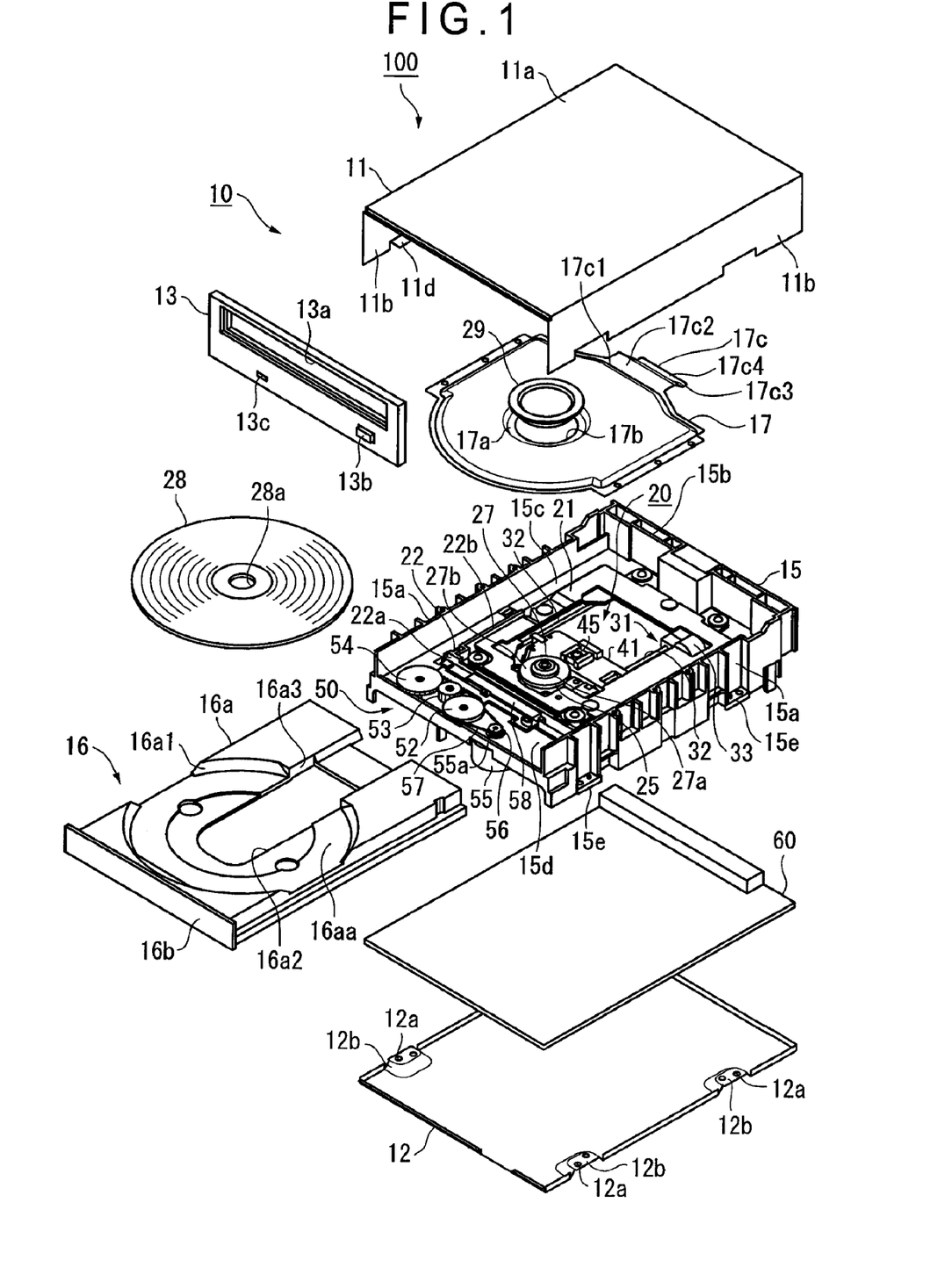
FIG. 1 is an exploded perspective view of a disk drive according to a first embodiment of the present invention.
Figure 2:
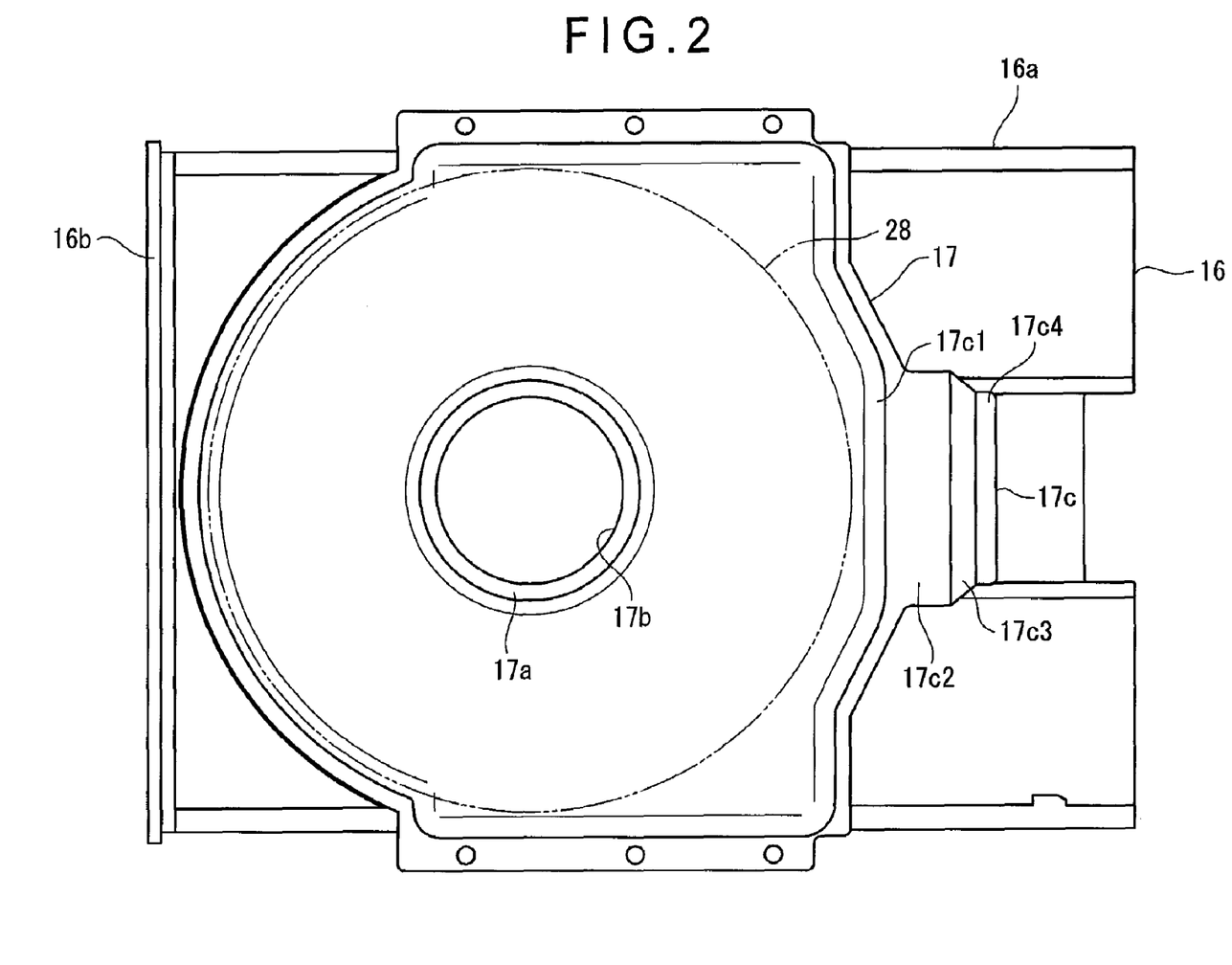
FIG. 2 is a plan view showing a relationship between a disk tray and a rotor support member in the first embodiment.
Figure 3:
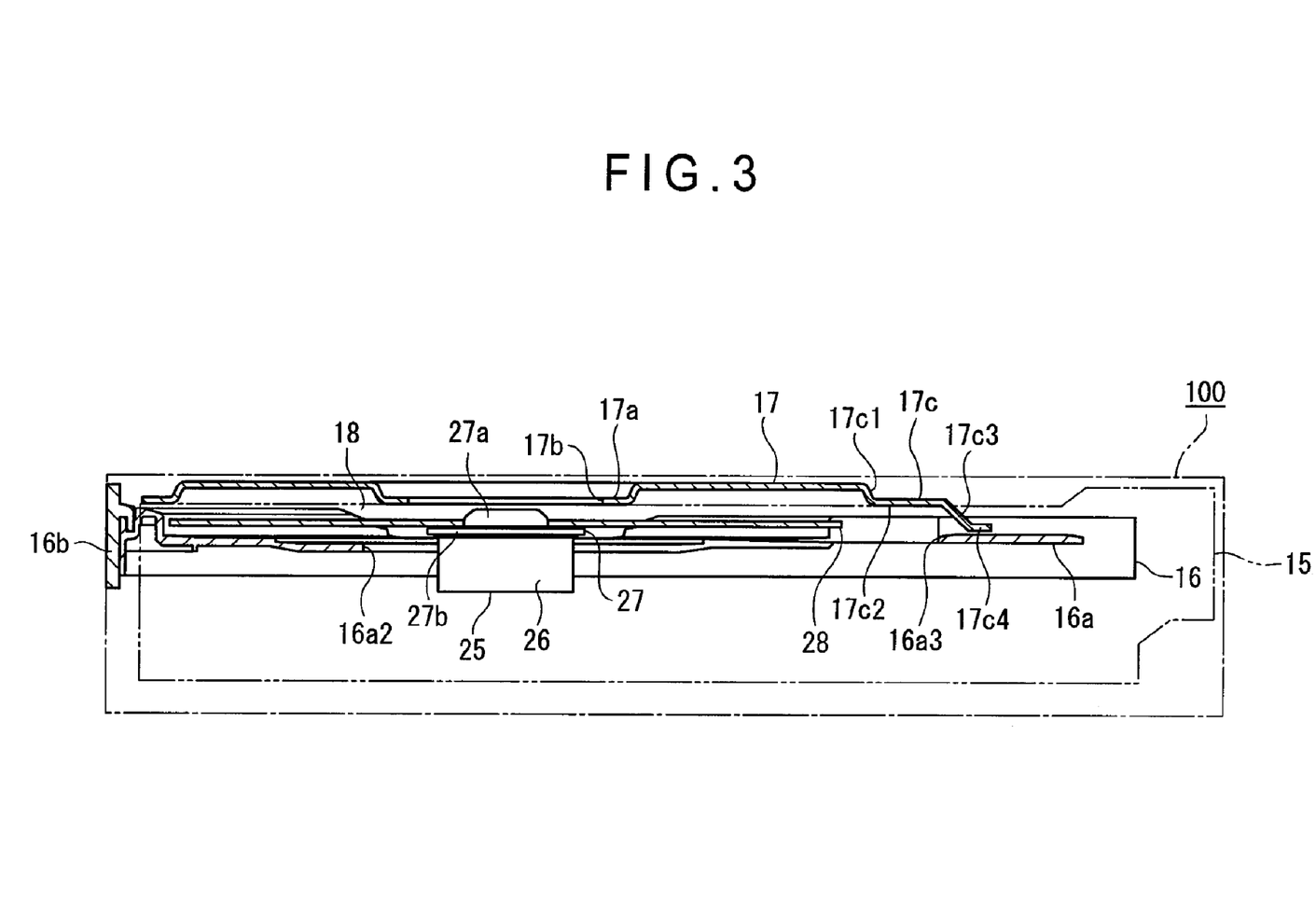
FIG. 3 is a side sectional view of the elements shown in FIG. 2.

FIG. 1 is an exploded perspective view of a disk drive in the present embodiment showing a configuration of the same. FIG. 2 is a plan view showing a relationship between a disk tray in a retracted position or home position and a rotor support member. FIG. 3 is a side sectional view of the elements shown in FIG. 2.

In FIG. 1, reference numeral 100 represents a disk drive which has a case 10 made of metal. The case 10 has an upper case 11 which is open on two sides thereof, i.e., a bottom side and a front side, a lower case 12 which closes the bottom side of the upper case 11, and a decorative panel 13 which closes the front side of the upper case 11.

The upper case 11 is formed by a top plate 11a having a flat rectangular shape, side plates 11b which are formed substantially perpendicularly to and integrally with both longitudinal side edges of the top plate 11a by bending the top plate 11a, and an end plate (not shown) formed in the same direction as the side plates 11b or perpendicularly and integrally with the edge of one longitudinal end of the top plate 11a by bending the top plate 11a, the bottom side and front side of the case being open. The bottom edges of the side plates 11b of the upper case 11 are inwardly bent in a plurality of locations, e.g., two locations to provide mounting pieces 11d formed with screw holes which are not shown.

The lower case 12 is formed in a flat rectangular shape that is substantially the same as that of the top plate 11a of the upper case 11. The lower case 12 is bent so as to bulge upward in association with the mounting pieces 11d on the top plate 11a to provide mounting dowels 12b which are formed with screw holes 12a.

Further, the decorative panel 13 is formed in a substantially plate-like shape from a synthetic resin such as Acrylonitrile-Butadiene-Styrene (ABS). The decorative panel 13 is provided with engaging nails (not shown) which substantially vertically project from one side of the plate, the ends of the nails being disengage ably engaged with the side plates 11b of the upper case 11 and the lower case 12. The decorative panel 13 is formed with an elongate window 13a extending in the left-and-right direction that is the longitudinal direction of the panel. Further, the decorative panel 13 is provided with a switch operating section 13b and an operation check window 13c.

The case 10 has a frame 15 made of a synthetic resin such as ABS having rigidity and insulating properties. The frame 15 is disposed in an inner space defined by the upper case 11, the lower case 12, and the decorative panel 13. The frame 15 has side sections 15a which are in tight contact with inner surfaces of the side plates 11b of the upper case 11, an end face section 15b which is in tight contact with an inner surface of the end plate of the upper case 11, support ribs 15c inwardly projecting from inner surfaces of the side sections 15a and the end face section 15b, and an opening/closing driver disposing section 15d provided in the form of a bridge connecting the ends of the side sections 15a opposite to the end face section 15b. The frame 15 is formed as a substantially square frame, which is open at both end faces in the axial direction thereof. Mounting ribs 15e are fixed on the side sections 15a of the frame 15 with screws while clamped between the mounting pieces 11d on the upper case 11 and the mounting dowels 12b of the lower case 12.

A main body 20 is disposed in the frame 15. For example, the main body 20 has a base section 21 made of metal and formed like a flat frame. The base section 21 is mounted on the support rib 15c projecting from the end face section 15b of the frame 15 with one edge thereof fixed with a screw such that another edge can be rotated in the vertical direction. A rotation guide section 22 is integrally attached to one edge of the base section 21. The rotation guide section 22 has a mounting/holding part 22a which extends along one edge of the base section 21 and to which the base section 21 is integrally fixed with screws, and a pair of rotating arms 22b which are projected substantially perpendicularly to and integrally from both longitudinal ends of the mounting/holding part 22a and whose ends are rotatably pivoted by the support ribs 15c projecting from the side sections 15a of the frame 15. The rotation of the base section 21 is guided by the rotation guide section 22.

Further, a disk rotation driver 25, as a rotation drive section is disposed at the rotating edge of the base section 21. The disk rotation driver 25 has a rotation motor 26 such as a spindle motor and a turntable 27, as one of clamping members, provided integrally with an output shaft of the rotation motor 26, which is not shown. The turntable 27 has a substantially cylindrical rotation shaft 27a inserted in a shaft hole 28a formed in the middle of an optical disc 28 and a flange 27b which projects from the outer circumference of the rotation shaft 27a and on which the periphery of the shaft hole 28a of the optical disc 28 is set. A magnet, which is not shown, is embedded at the end of the rotation shaft 27a of the turntable 27.

A movement unit 31 is disposed on the base section 21. The movement unit 31 has a pair of guide shafts 32 and a movement motor 33. The pair of guide shafts 32 is disposed such that their axial direction extends from the pivoted other edge of the base section 21 to the rotating edge of the same. The movement motor 33 is disposed such that the axial direction of an output shaft thereof, which is not shown, agrees with the axial direction of the guide shaft 32. A spiral engaging groove, which is not shown, is provided on an outer circumferential surface of the output shaft of the movement motor 33.

Further, a reproduction unit 41 is disposed on the movement unit 31. The reproduction unit 41 has a moving/holding part (not shown) which is provided so as to bridge the pair of guide shafts 32 to be supported thereby. The moving/holding part is provided with a holder (not shown) in which the guide shaft 32 is movably inserted and a movement regulating nail (not shown), which is, engaged with the engaging groove on the output shaft of the movement motor 33. The moving/holding part of the reproduction unit 41 is further provided with a pickup 45, as a data processing unit, having a light source which is not shown, a lens for converging light from the light source, and an optical sensor (not shown) for detecting light reflected by the optical disc 28.

In the frame 15, a disk tray 16 is disposed, which is retractably moved in the horizontal direction, above the support ribs 15c. As shown in FIGS. 1 to 3, the disk tray 16 has a tray section 16a that is a tray formed substantially like a rectangular plate from, for example, a synthetic resin. On one side of the tray section 16a, there is provided a tray recess 16a1 for housing the optical disc 28, which is a substantially circular recess being spread upward and which has a flat surface 16aa that is a flat part on which the optical disc 28 can be set. The tray section 16a is formed with an opening 16a2 as an inner opening, which extends substantially from the center of the tray recess 16a1 up to the outer circumferential edge of the same in association with the disk rotation driver 25 and the reproduction unit 41 of the main body 20. Further, the tray section 16a is cut at the periphery of the tray recess 16a1 where the opening 16a2 is located to form a recess 16a3 as an outer opening, in the form of a recess, which has a concave shape allowing the pickup 45 to be inserted therein while moving without contacting the same and which is continuous with the opening 16a2. The recess 16a3 is formed such that the pickup 45 will not contact the tray section 16a even when it is located in an outer circumferential position of the optical disc 28 housed in a housing space 18 to read data recorded at the outer circumferential position or to record data in the outer circumferential position of the optical disk 28. A window closing plate 16b that is an elongate plate formed from the same material as the decorative panel 13 is detachably attached to one edge of the tray section 16a in the longitudinal direction thereof to close the window 13a of the decorative panel 13 of the case 10.

As shown in FIG. 1, an opening/closing driver 50 is disposed in the opening/closing driver disposing section 15d of the frame 15. The opening/closing driver 50 has a drive transmission pulley 52 rotatably pivoted by the opening/closing driver disposing section 15d in engagement with the same, a drive transmission gear 53 engaged with the drive transmission pulley 52, and a moving gear 54 engaged with the drive transmission gear 53 and the disk tray 16. The opening/closing driver 50 has an advancing/retracting motor 55. A pulley 56 is provided integrally with an output shaft 55a of the advancing/retracting motor 55. An endless belt 57 is stretched around the pulley 56 and the drive transmission pulley 52. When the advancing/retracting motor 55 is driven, the pulley 56, the drive transmission pulley 52, the drive transmission gear 53, and the moving gear 54 are rotated to move the disk tray 16 such that it can be advanced and retracted into and from the window 13a on the decorative panel 13.

The opening/closing driver 50 has a moving cam 58 movably disposed in the opening/closing driver disposing section 15d of the frame 15 along the opposite direction of the side sections 15a. The moving cam 58 engages the rotation guide section 22 integrally attached to the base section 21 and engages the drive transmission gear 53. When the advancing/retracting motor 55 is driven to rotate the drive transmission gear 53, the moving cam 58 moves to rotate the base section 21 up and down. The moving cam 58 rotates the base section 21 upward when the disk tray 16 is in a retracted position in the frame 15, while the base section 21 is rotated downward when the disk tray 16 is advanced or retracted to prevent it from contacting the disk tray 16.

The main body 20 is formed by the above-described disk rotation driver 25, the movement unit 31, the reproduction unit 41, and the opening/closing driver 50.

The frame 15 includes a rotor support member 17, which is a support member in the form of a cover, fixed between the side sections 15a with screws so as to bridge them. As seen in FIGS. 1 to 3, the rotor support member 17 is formed, for example, by press work of a metal plate and is substantially formed like a thin dish whose periphery is inclined, in a state being spread, facing in one direction. One edge of the rotor support member 17 is formed with an arcuate shape adapted to the tray recess 16a1 of the disk tray 16 to substantially cover the tray recess 16a1, thereby defining the housing space 18 in which the optical disc 28 is housed. Substantially in the middle of the rotor support member 17, a support recess 17a is provided in substantially the same position as the center of the arcuate edge, the recess facing upward in a position opposite to the turntable 27 of the disk rotation driver 25. An opening is formed substantially in the middle of the support recess 17a to provide a support hole 17b. A rotor 29 as another clamping member is rotatably set in the support recess 17a of the rotor support member 17. The rotor 29 is substantially in the form of a disk, and the outer circumferential edge of the rotor is formed to be engageable with the periphery of the support hole 17b. A magnetic material such as a metal plate, which is not shown, is integrally attached to the rotor 29, and the rotor 29 cooperates with turntable 27 to clamp the optical disc 28 utilizing the magnetic force of the magnet in the turntable 27.

Further, a cover section 17c projects from the rotor support member 17 integrally therewith at the edge of the rotor support member 17 opposite to the arcuate edge, the cover section 17c having a substantially tongue-like shape adapted to the recess 16a3 of the disk tray 16. The cover section 17c has an inclined base end part 17c1 which is bent to be closer to the disk tray 16 than the surface opposing the optical disc 28 housed in the housing space 18, a parallel part 17c2 which is formed integrally with the inclined base end part 17c1 by bending the edge of the same and which has a disk opposite surface 17ca, which is not shown, opposing the optical disc 28 substantially in parallel therewith, an inclined end part 17c3 which is formed integrally with the parallel part 17c2 by bending the end of the same and whose end is inclined toward a top surface of the disk tray 16 located outside the tray recess 16a1, and an opposite part 17c4 which is formed integrally with the inclined end part 17c3 by bending the edge of the same and which opposes the top surface of the disk tray 16 located outside the tray recess 16a1 in proximity to and substantially in parallel therewith the surface without touching the same. That is, the cover section 17c is bent plural times to be close to the disk tray 16 and projected in the form of a tongue such that it opposes the recess 16a3 at an interval smaller than the interval at which the rotor support member 17 opposes the tray section 16a.

As shown in FIG. 1, a circuit board 60 is attached to the frame 15. The circuit board 60 is attached such that it can be engaged and disengaged by means of a board mounting nail, which is not shown, provided on the frame 15. The circuit board 60 is in the form of a flat plate which is substantially the same in dimensions as the lower case 12 of the case 10, and it is attached so as to cover the main body 20, thereby closing the bottom side of the frame 15. The circuit board 60 carries a control circuit for controlling operations of the main body 20.

(Operations of Disk Drive)

The operations of the disk device 100 in the above embodiment will now be described.

First, power is supplied to the disk device 100. The user then operates the switch operating section 13b on the decorative panel 13. An operation on the switch operating section 13b causes a switch, which is not shown, provided on the circuit board 60 to open and close, whereupon the control circuit on the circuit board 60 drives the advancing/retracting motor 55 of the opening/closing driver 50. When the advancing/retracting motor 55 is driven, the pulley 56, the drive transmission pulley 52, the drive transmission gear 53, and the moving gear 54 rotate to move the disk tray 16 engaged with the moving gear 54 in the direction of advancing from the window 13a on the decorative panel 13. During the movement, the moving cam 58 of the opening/closing driver 50 also moves to rotate the rotation guide section 22 engaged with the moving cam 58 downward. As a result, the base section 21 is rotated downward to retract the main body 20 such that it will not interfere with the advancing disk tray 16.

The optical disc 28 is set in the tray recess 16a1 of the disk tray 16 thus advanced with the recording surface of the optical disc 28 facing downward. Thereafter, the switch operating section 13b of the decorative panel 13 is operated again to drive the advancing/retracting motor 55 of the opening/closing driver 50, and the disk tray 16 is thereby retracted into the window 13a and returned to the home position. When the disk tray 16 is thus retracted, the main body 20 which has been retracted downward is moved upward along with the base section 21 by the rotation guide section 22 engaged with the moving cam 58. As a result of the upward rotation of the main body 20, the rotation shaft 27a of the turntable 27 of the disk rotation driver 25 is inserted into the shaft hole 28a of the optical disc 28. Further, the optical disc 28 is clamped and secured between the turntable 27 and the rotor 29 by the magnetic force of the magnet in the turntable 27.

In this state, the control circuit on the circuit board 60 controls the main body 20 such that the pickup of the reproduction unit 41 that is appropriately moved by the movement unit 31 reads or records data from or on the optical disc 28 rotated by the rotation motor 26 of the disk rotation driver 25. During the rotation of the optical disc 28, even if the disc is rotated at a relatively high speed of, for example, 6500 to 7000 rpm or more, since the recess of the disk tray 16 is covered from above by the cover section 17c of the rotor support member 17, it is possible to prevent flutter from being generated due to an airflow generated by the rotation of the optical disc 28 or a difference between pressures on both sides of the optical disc 28. The optical disc 28 can therefore be rotated with stability.

(Effects and Advantages of First Embodiment)

As described above, in the above embodiment, the rotor support member 17 is provided on a disk tray 16, and it opposes the recording surface of the optical disc 28 on which data are recorded and defines the substantially cylindrical housing space 18 which houses the optical disc 28 in a substantially coaxial relationship therewith so as to cover the tray recess 16a1 having the flat surface 16aa for setting the optical disc 28 from above. The rotor support member 17 is provided with the cover section 17c which covers the recess 16a3 located outwardly from the outer circumferential edge of the optical disc 28 housed in the housing space 18 or located outside the flat surface 16aa, the cover section 17c being spaced from the recess at an interval smaller than the interval at which the opening 16a2 is covered, the opening 16a2 being a gap between the flat surface 16aa and the part of the rotor support member 17 opposing the same. This suppresses communication of air between the housing space 18 and the surroundings through the recess 16a3 caused by the rotation of the optical disc 28. As a result, even when the optical disc 28 is rotated at a high speed, it is possible to reduce flutter generated due to an airflow or a difference between pressures on both sides of the optical disc 28 and to thereby rotate the optical disc 28 with stability. Therefore, the optical disc 28 can be rotated at a high speed to allow a reduction in processing time required for reading and recording data, and the stable rotation allows data to be recorded in higher densities and allows the amount of recorded data to be increased easily.

The cover section 17c covering the recess 16a3 of the disk tray 16 is provided integrally with the rotor support member 17 which supports the rotor 29 for clamping the optical disc 28 in the axial direction. Thus, the cover section 17c can be more easily formed than in the case of providing it as a separate element, which allows manufacturability to be improved easily.

The cover section 17c is formed with a plurality of bends being kept close to the disk tray 16. As a result, the housing space 18 can be provided with improved air-tightness when the recess 16a3 is covered with a simple configuration, and the generation of flutter can therefore be reduced with a simple configuration.

Further, the rotor support member 17 is formed by press-work of a metal plate such that the cover section 17c projects substantially in the form of a tongue adapted to the recess 16a3. Thus, the rotor support member 17 having the cover section 17c can be easily molded by a single action without making any change in manufacturing methods according to the related art.

Furthermore, the cover section 17c is formed in a substantially tongue-like shape adapted to the recess 16a3 provided to prevent interference of the pickup 45. It is therefore possible to prevent flutter using a simple shape having minimum dimensions and to thereby prevent any increase in the size of a device.

The opposite part 17c4 which is bent so as to be substantially parallel to the top surface of the disk tray 16 is provided at the end of the cover section 17c. Thus, air-tightness can be easily achieved in the housing space 18 with a simple structure when the recess 16a3 is covered from above, which makes it possible to reliably prevent the occurrence of flutter with a simple configuration and to thereby allow the optical disc 28 to be rotated with stability.

[Second Embodiment]

Figure 4:
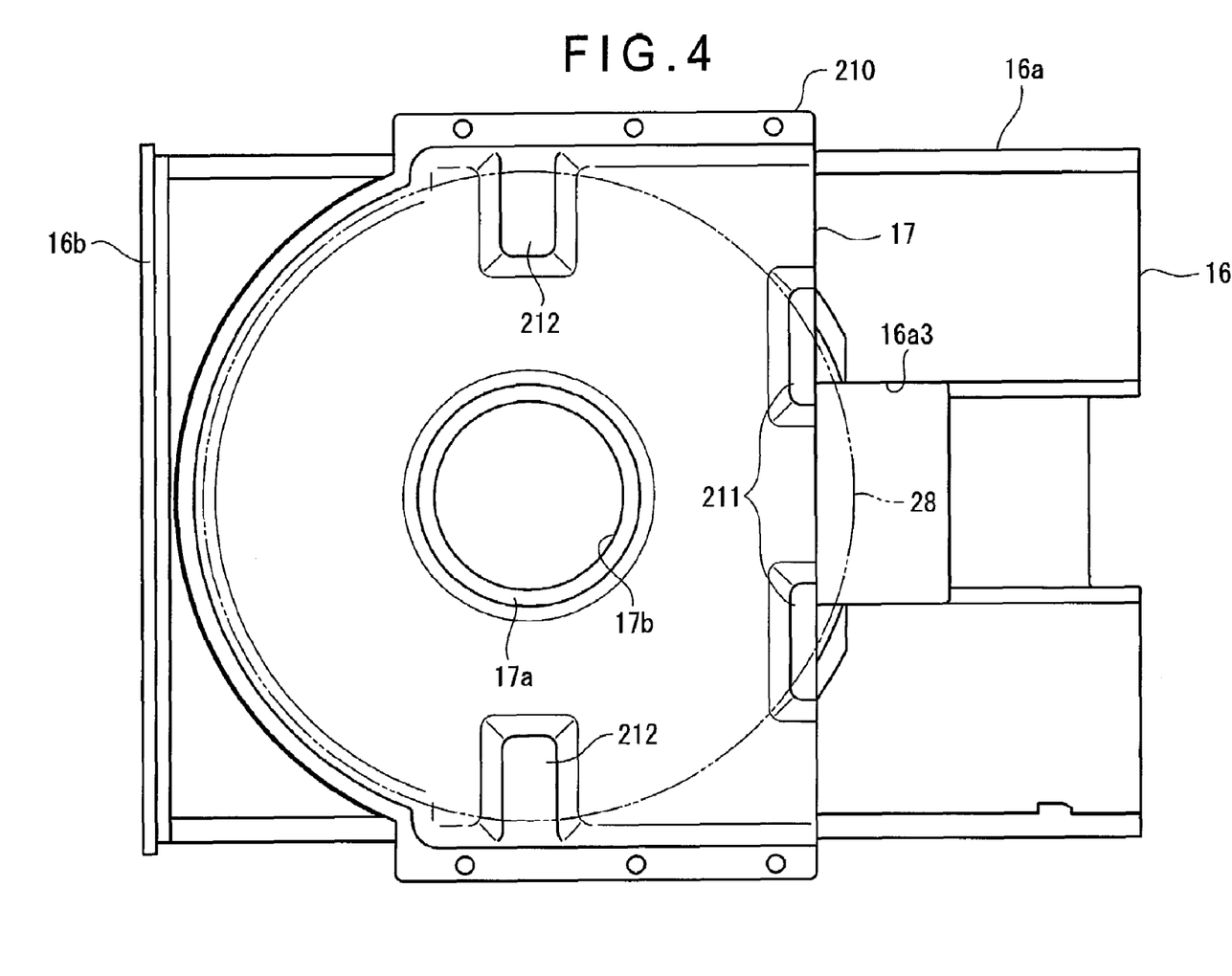
FIG. 4 is a plan view showing a relationship between a disk tray and a rotor support member of a disk drive according to a second embodiment of the present invention.
Figure 5:
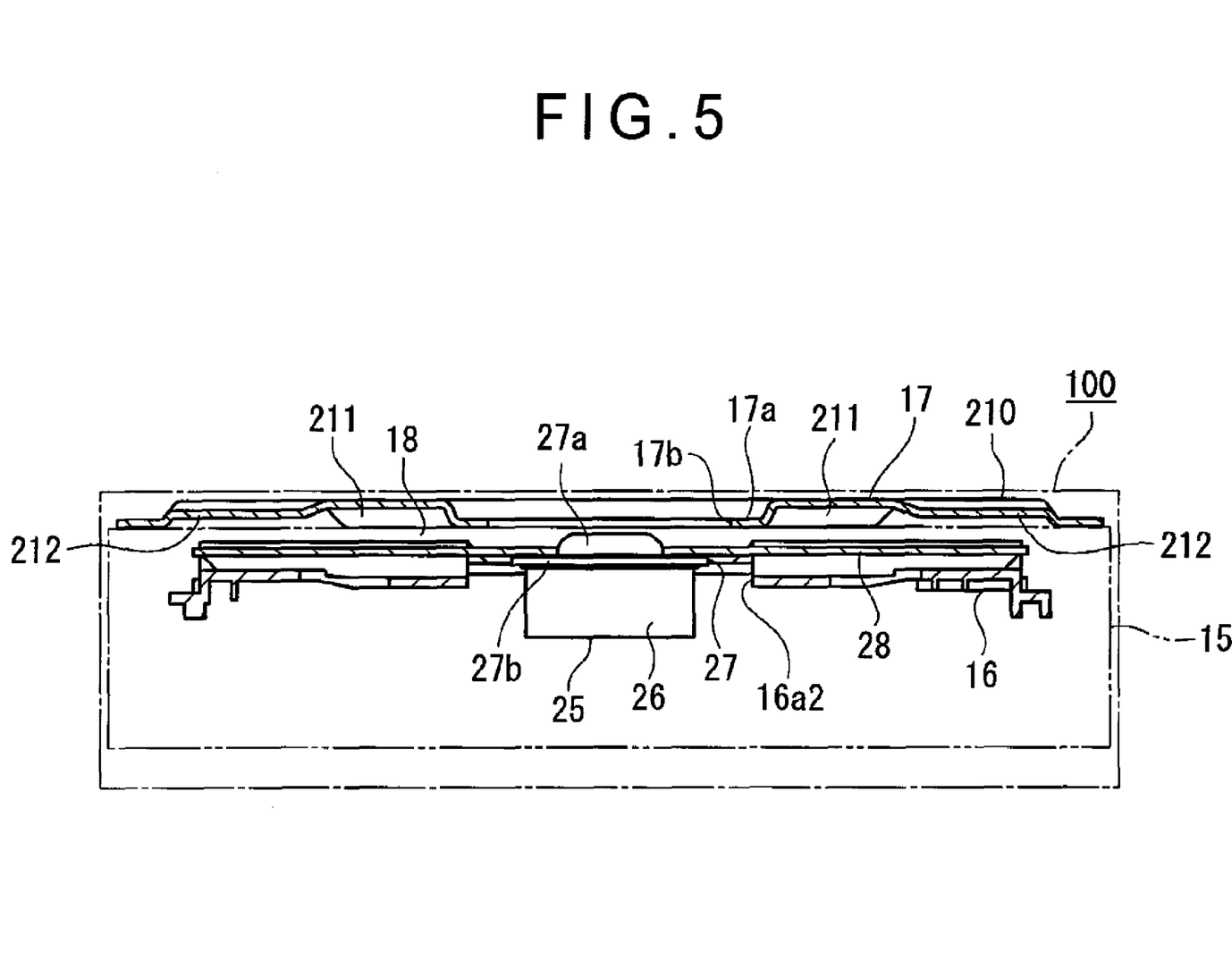
FIG. 5 is a front sectional view of the elements shown in FIG. 4.

A second embodiment of the present invention will now be described based on the drawings. The present embodiment is similar to the first embodiment except that the shape of the rotor support member 17 is changed. The description will therefore omit like features which will be indicated by like reference numerals. FIG. 4 is a plan view showing a relationship between a disk tray in the retracted or home position and a rotor support member. FIG. 5 is a front sectional view of the elements in FIG. 4.

(Configuration of Rotor Support Member)

A disk device 100 has a frame 15 that is similar to that in the first embodiment. As shown in FIGS. 4 and 5, the frame 15 is provided with a rotor support member 210 as a cover which is formed, for example, by press work of a metal plate like a substantially thin dish and which is secured with screws such that it bridges side sections 15a. Similarly to the rotor support member 17 in the first embodiment, one edge of this rotor support member 210 is formed in an arcuate shape adapted to a tray recess 16a1 of a disk tray 16, and the support member substantially covers the tray recess 16a1 to define a housing space 18 in which an optical disc 28 is housed. Substantially in the middle of the rotor support member 210, a support recess 17a is provided in substantially the same position as the center of the arcuate edge, the recess facing upward and supporting the rotor 29 in a position opposite to a turntable 27 of a disk rotation driver 25.

Further, at the edge of the rotor support member 210 opposite to the arcuate edge, reinforcement ribs 211 are formed using a drawing process such that they bulge in the direction in which the support recess 17a bulges. The reinforcement ribs 211 are provided in positions corresponding to the outer circumferential edge of the optical disc 28 housed in the housing space 18. A pair of projections 212 in the form of ribs is provided in positions near the edge of the rotor support member 210 attached to the frame 15, the projections 212 extending in the radial direction of the optical disc 28 housed in the housing space 18 to the opposite tray section 16a and bulging from the circumferential edge of the bottom surface of the support member 210 that defines the housing space 18. Specifically, the pair of projections is provided in the form of ribs extending in the direction substantially orthogonal to the longitudinal direction of the opening 16a2 of the tray section 16a such that they face each other in that substantially orthogonal direction. That is, they are provided in a so-called point symmetrical relationship about the center of the optical disc 28 housed in the housing space 18. The reinforcement ribs 211 and the projections 212 are processed using drawing to provide them with inclined circumferential surfaces such that their dimensions increase toward the base ends. Specifically, they are formed integrally with the rotor support member 210 when the member is pressed.

(Effects and Advantages of Second Embodiment)

As thus described, the rotor support member 210 is provided on the disk tray 16, and it opposes the recording surface of the optical disc 28 on which data are recorded and defines the substantially cylindrical housing space 18 which houses the optical disc 28 in a substantially coaxial relationship therewith so as to cover the tray recess 16a1 having the flat surface 16aa for setting the optical disc 28 from above. The projections 212 are provided on the bottom surface of the rotor support member 210 defining the housing space 18 and opposing the optical disc 28 such that their ends face at least a part of the outer circumferential edge of the optical disc 28. As a result, an airflow generated by the rotation of the optical disc 28 is directed to and sprayed on the optical disc 28 by the projections 212, and the airflow holds down the disc to prevent it from being inclined due to flutter. Thus, flutter generated by an airflow or a difference between pressures on both sides of the optical disc 28 can be reduced even when the optical disc 28 is rotated at a high speed. Even if flutter is generated, the periphery of the non-recording surface of the optical disc 28 abuts on the ends of the projections 212 as a result of an increase in the inclination of optical disc attributable to the flutter, and any further inclination of the optical disc 28 can be thereby prevented. It is therefore possible to prevent great fluctuations of the distance between the pickup 45 and the recording surface and to thereby record and read data properly. Thus, the optical disc 28 can be rotated at a high speed, and the processing time required for reading and recording data can be easily reduced.

The projections 212 are in the form of ribs which extend in the radial direction from the outer circumferential edge of the surface of the rotor support member 210 defining the housing space 18 toward a position corresponding to the center of the optical disc 28 housed in the housing space 18. Since the projections 212 are provided in positions corresponding to the outer circumference of the optical disc 28 such that they extend in the radial direction of optical disc, it is possible to reduce flutter generated by an airflow or a difference between pressures on both sides of the optical disc 28 with a simple structure. Even if flutters are generated, tilting of the optical disc 28 can be properly suppressed. In particular, the pair of projections 212 symmetrically acts on the optical disc 28 because they are provided in the radial direction of optical disc, which makes it possible to suppress flutter with a simple configuration.

The projections 212 are provided with inclined circumferential surfaces so that their dimensions increase toward the bases ends thereof As a result, an airflow generated by the rotation of the optical disc 28 is smoothly guided by the inclined circumferential surfaces toward the optical disc 28 and is sprayed on the optical disc 28 to hold it down. It is therefore possible to properly reduce flutter with a simple configuration, and the generation of noises can be also suppressed because the inclined surfaces suppresses the generation of turbulence at the projections 212.

Further, the pair of projections 212 is point-symmetrically provided in the radial direction such that they face each other in the direction substantially orthogonal to the longitudinal direction of the opening 146a2 where the pickup 45 is located. Thus, flutter of the optical disc 28 can be efficiently reduced, and the optical disc 28 can be properly rotated with a simple configuration.

The projections 212 are formed using a drawing process such that they bulge from the rotor support member 210 integrally therewith when the support member is pressed. As a result, the projections 212 for reducing flutter can be easily formed in a single action without making any change to manufacturing methods according to the related art.

The projections 212 are provided integrally with the rotor support member 210, which supports another rotor 29 clamping the optical disc 28 in the axial direction thereof in the same manner as in the first embodiment. Thus, the projections 212 can be more easily formed than providing them as separate elements, and manufacturability can therefore be easily improved.

The reinforcement ribs 211 are formed in positions of the rotor support member 210 corresponding to the outer circumferential edge of the optical disc 28 such that they project toward the optical disc 28 similarly to the projections 212. Therefore, the reinforcement ribs 211 work similarly to the projections 212 to allow a further reduction of flutter, and reinforcement and a reduction in flutter can be achieved with a single configuration. Thus, the versatility of the elements allows a configuration to be easily simplified.

[Modification of the Embodiments]

The invention is not limited to the above-described embodiments and may be modified as described below within a scope in which the object of the present invention can be achieved.

The disk device 1 according to the present invention is not limited to configurations to accommodate an optical disc 28 as described above, and the device accommodates any disk from and on which data can be optically or magnetically reproduced and recorded, such as magnetic disks and magneto-optical discs.

Although the disk device 100 has been described as having a configuration including the disk tray 16 moved by the opening/closing driver 50, any configuration may be employed, including a configuration in which the disk tray 16 is replaced by a transport device for inserting and ejecting the optical disc 28 through the window 13a of the decorative panel 13 with a rotating body or the like disposed in the device, a configuration in which a case rotatably housing an optical disc 28, like an MD (Mini Disk), is directly inserted and ejected through the window 13a, a configuration in which an optical disc 28 housed in a predetermined case is inserted and ejected, and a configuration as seen in a portable disk device, in which the opening/closing driver 50 is further eliminated, and the upper case 11 of the case 10 openably covers the main body 20 from above and in which a tray is made to face the recording surface of the optical disc 28 without setting optical disc directly on the tray, and the upper case 11 is rotated so as to cover the optical disc 28 after optical disc is set in a predetermined position.

For example, the configuration excluding the moving disk tray 16 may include the cover section 17c provided in a position associated with the recess 16a3 that is provided continuous with the tray recess 16a1 to prevent the pickup 45 from contacting any element. Alternatively, the configuration may include the projections 212 provided on the surface, which opposes the recording surface of the optical disc 28 and opposes the surface having the opening 16a2 to define the housing space 18. Specifically, the cover section 17c may be provided on the bottom surface of the upper case 11 opposing the tray recess 16a1, the cover section 17c serving as a lid as seen in a portable disk device, for example. Alternatively, the projections 212 may be provided in positions on the upper case 11 associated with the circumferential edge of the optical disc 28. In other words, the configuration without the rotor 29 may be applied. The invention is not limited to the integral configurations, and the cover section 17c and the projections 212 may be attached as separate elements.

Further, although the cover section 17c has been described as having a substantially tongue-like shape adapted to the recess 16a3, it may have any shape as long as the recess 16a3 is covered. Similarly, the projections 212 are not limited to the shape having an inclined circumferential surface to provide greater dimensions at the base ends of the projections. The projections may be bulged in a cylindrical shape. It is not essential to provide a pair of the projections, and they may be provided in a greater quantity. Furthermore, the projections may have any shape, which projects toward at least a part of the outer circumferential edge of the optical disc 28. For example, circular projections 212 may be provided in association with the outer circumferential edge of the optical disc 28.

Although the description has referred to a configuration in which the frame 15 is entirely housed in the substantially box-like case 10, other configurations may be employed including a configuration in which a part of the frame 15 is exposed from the case 10 and a configuration in which at least a part of the frame 15 is housed in the case 10 to keep the main body 20 unexposed, so that the part of the frame 15 constitutes a part of the case 10.

Although the rotor support members 17 and 210 have been described as being formed by press work of a metal plate, they may be formed using any method such as metal casting or injection molding of a synthetic resin.

A configuration may be employed, in which the cover section 17c of the first embodiment and the projections 212 of the second embodiment are combined. This configuration substantially eliminates flutter.

The specific structures and procedures for carrying out the present invention may be changed to other structures and so on as occasions demand within the scope in which the object of the present invention can be achieved.

Figure 6:
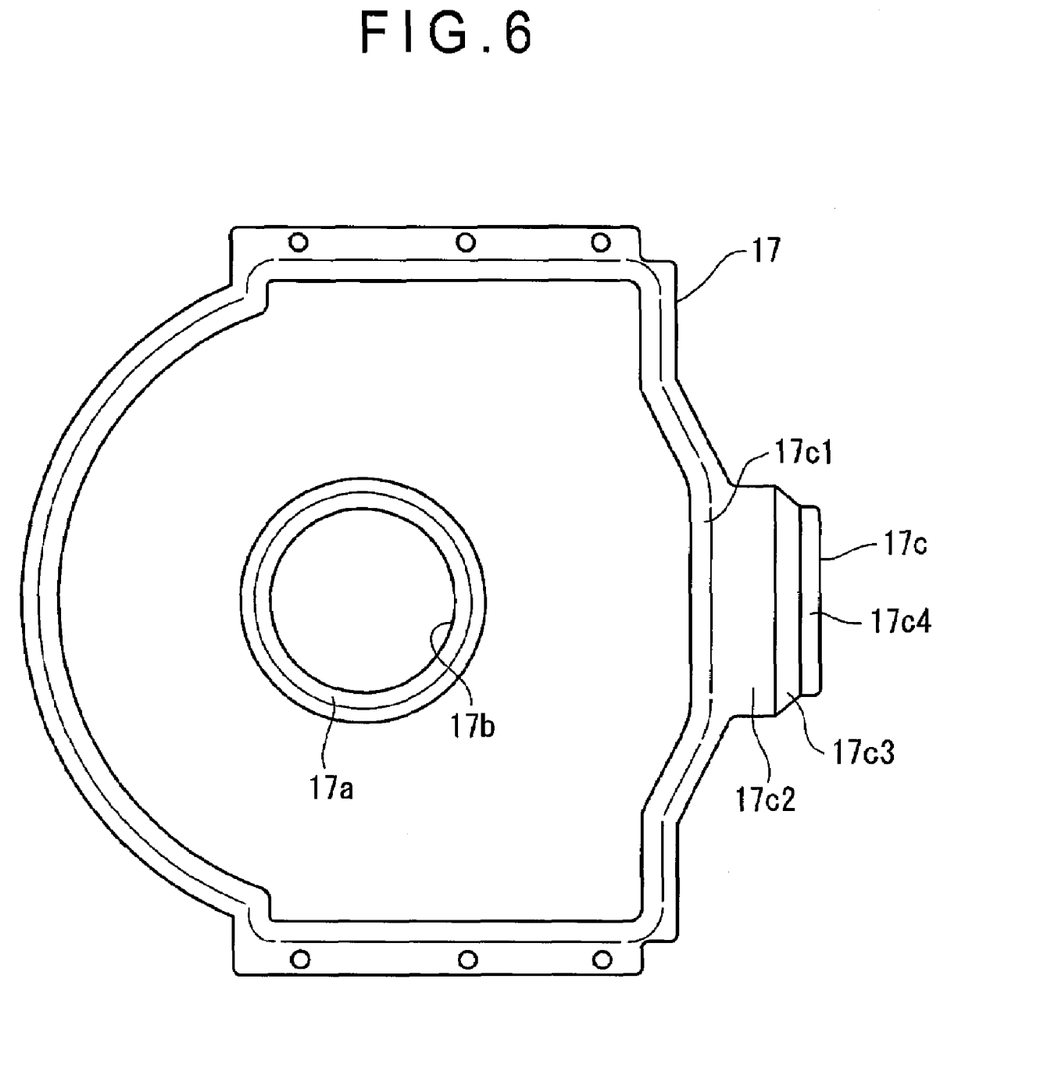
FIG. 6 is a plan view showing a sample used in Example 1 in an experiment for checking how flutter is suppressed according to the present invention.
Figure 7:
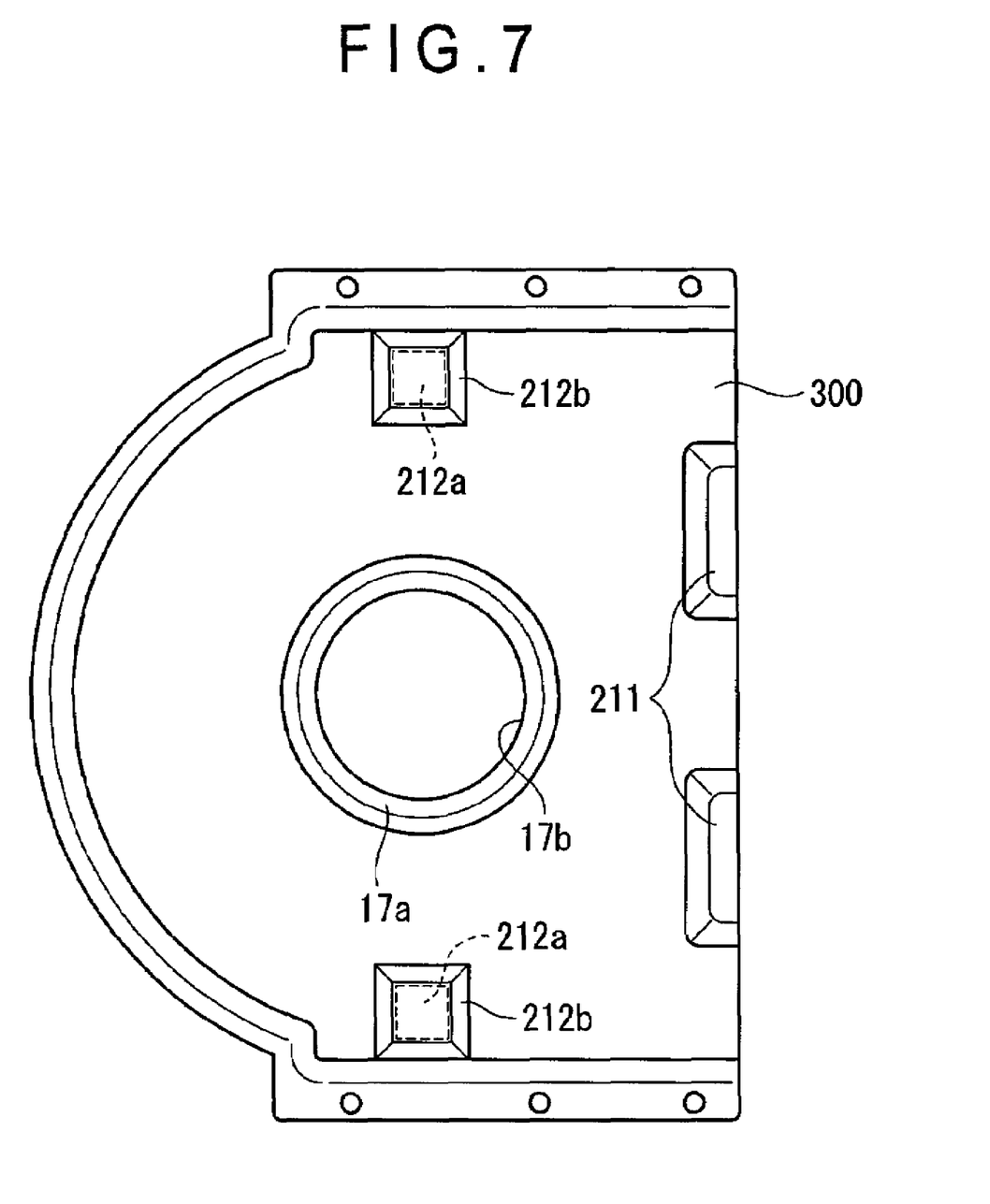
FIG. 7 is a plan view of a sample used in Example 2 in the experiment.
Figure 8:
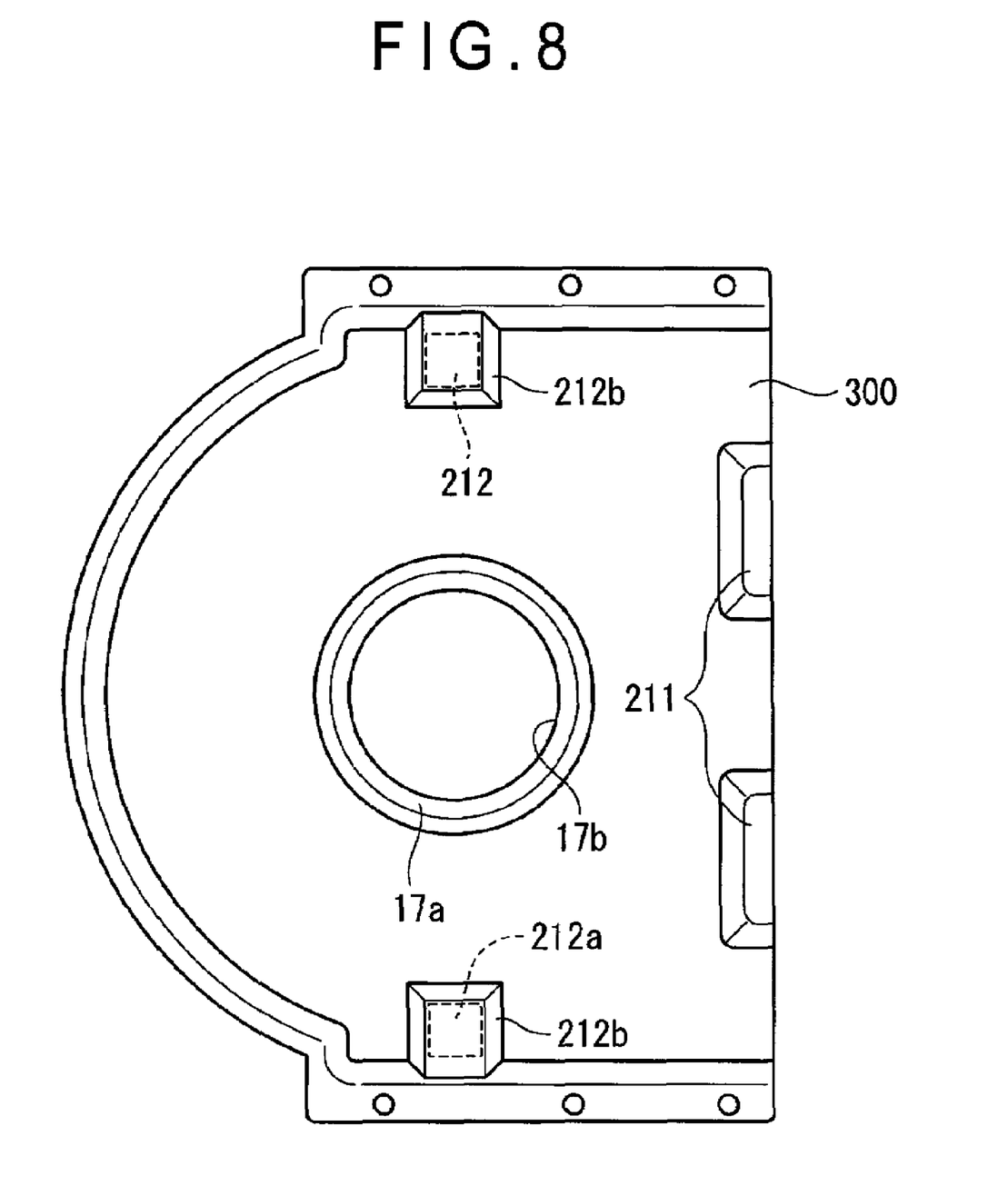
FIG. 8 is a plan view of a sample used in Example 3 in the experiment.
Figure 9:
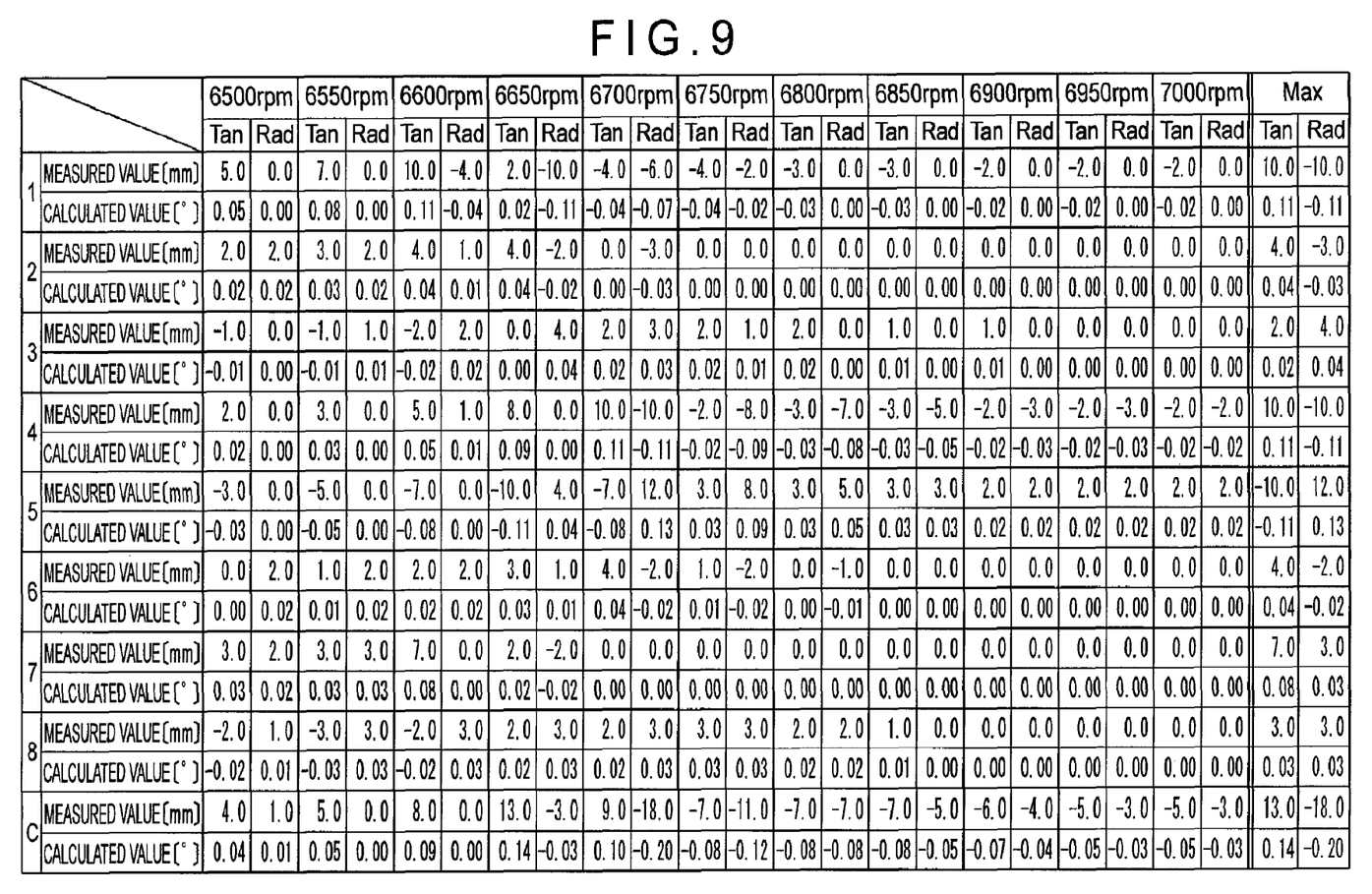
FIG. 9 shows results of the experiment in the form of a table on which states of inclination of optical discs during the experiment are listed.
Figure 10:
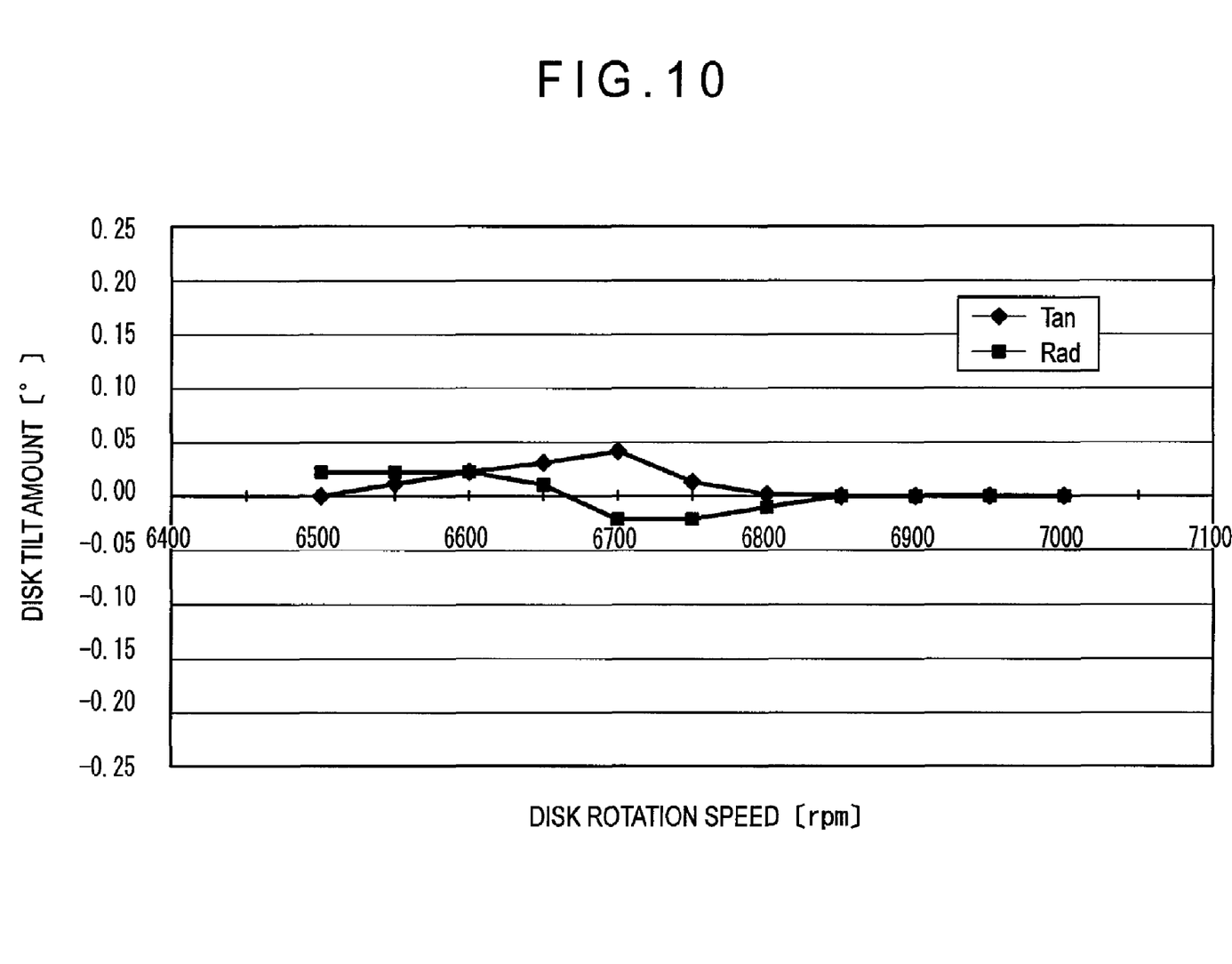
FIG. 10 is a graph showing results of the experiment conducted on Example 6.
Figure 11:
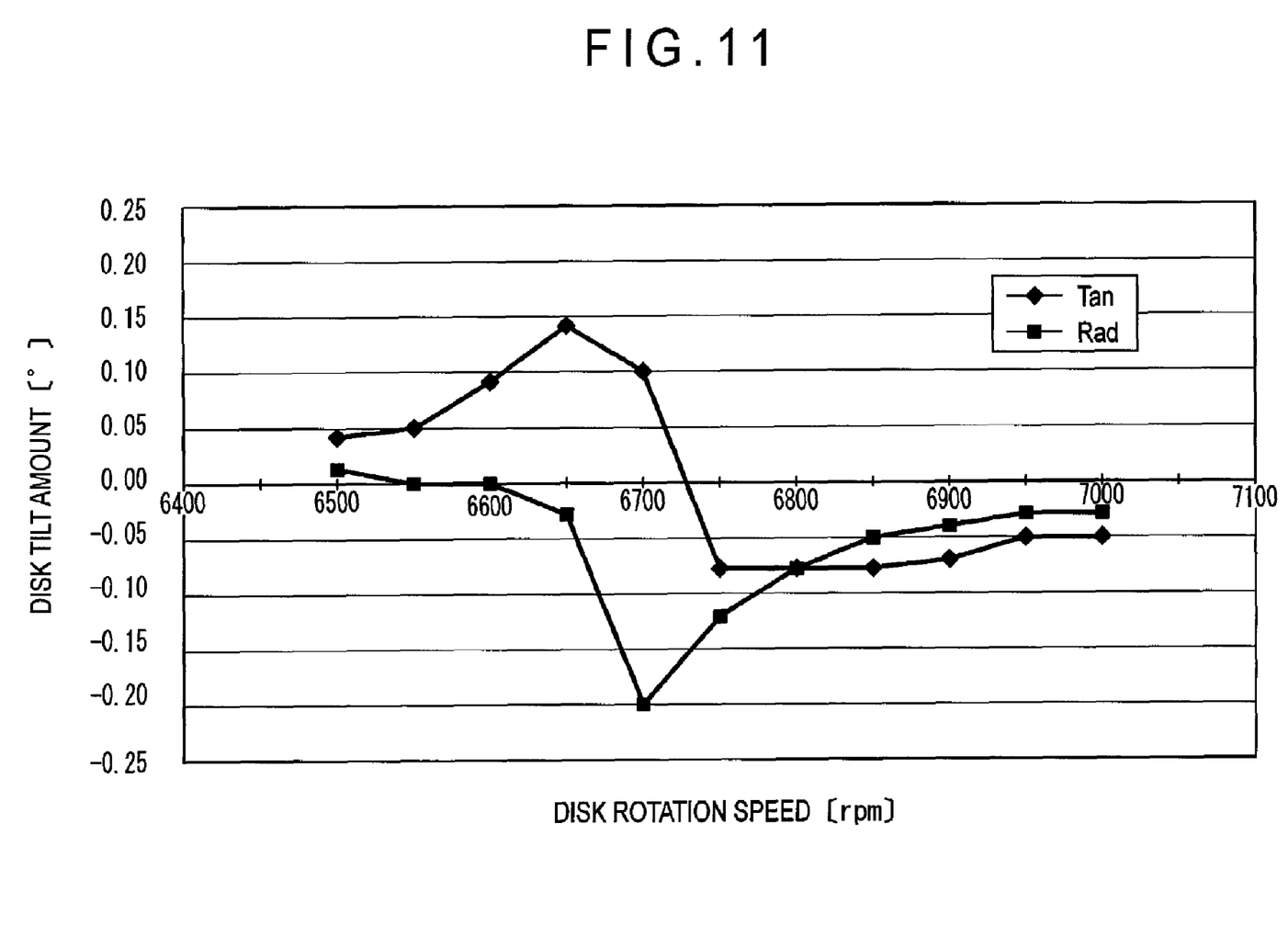
FIG. 11 is a graph showing results of the experiment conducted on a comparative example.

A description will now be made on results of experiments for checking how flutter is suppressed by the cover section 17c of the first embodiment and the projections 212 of the second embodiment. FIG. 6 is a plan view showing a sample used in Example 1. FIG. 7 is a plan view showing a sample used in Example 2. FIG. 8 is a plan view of a sample used in Example 3. FIG. 9 shows results of the experiment in the form of a table on which states of inclination of optical discs during the experiment are listed. FIG. 10 is a graph showing results of an experiment on Example 6. FIG. 11 is a graph showing results of an experiment on a comparative example.

Referring to the rotor support members used for the experiments, a rotor support member according to the related art having neither cover section 17c nor projections 212 was used as a comparative example, and an examination was conducted on a sample having the shape according to the first embodiment shown in FIG. 6, a sample obtained by adding projections 212 to the comparative example appropriately, and a sample obtained by adding projections 212 to the sample shown in FIG. 6. Referring to the projections 212, as shown in FIGS. 7 and 8, projecting members 212a obtained by forming an acrylic plate into appropriate square plates were applied to predetermined positions of a rotor support member 300 as the comparative example with adhesive tapes 212b. The adhesive tapes 212b were applied such that their peripheries are inclined similarly to the projections 212 as shown in FIG. 7 and such that their peripheries project toward the rotor support member 300 as shown in FIG. 8, the peripheries being in a trapezoidal shape that is inclined to be continuous with the inclined edge of the support member.

The experiments were conducted on Example 1 which is a disk drive configured using a sample according to the first embodiment shown in FIG. 6; Example 2 which is a disk drive configured using a sample obtained by applying projecting members having a length of 10 mm, a width of 10 mm, and a thickness of 2.85 mm to the comparative example in positions spaced from the center of the support recess 17a by a distance 52 mm that is equivalent to the radius of the optical disc 28 as shown in FIG. 7; Example 3 which is a disk drive configured using a sample obtained by applying the projecting members of Example 2 to the comparative example such that the sample extends up to the edge of the support member as shown in FIG. 8; Example 4 which is same as Example 3 except that the projecting members are modified to have a length of 5 mm, a width of 10 mm, and a thickness of 2.85 mm; Example 5 which is same as Example 3 except that the projecting members are modified to have a length of 15 mm, a width of 10 mm, and a thickness of 2.85 mm; Example 6 which is same as Example 3 except that the projecting members are modified to have a length of 10 mm, a width of 10 mm, and a thickness of 2.45 mm; Example 7 in which projecting members having a length of 10 mm, a width of 10 mm, and a thickness of 1.5 mm are applied to the sample in Example 1 in the same position as those in Example 2; and Example 8 in which projecting members having a length of 10 mm, a width of 10 mm, and a thickness of 2.85 mm are applied to the sample in Example 1 in the same position as those in Example 3.

The experiment was carried out by forming a substantially circular measurement hole on each of the samples and measuring inclinations of the optical disc 28 during rotation using laser light. Specifically, the optical disc 28 rotating in a position opposite to the pickup 45 was irradiated with laser light, and inclinations was measured from positions to which the reflected laser light returned. Measurements were conducted on the basis of the inclination of the optical disc 28 during rotation at 6000 rpm to check tangential (Tan) inclinations that are inclinations of the optical disc 28 in the tangential direction thereof and radial (Rad) inclinations that are inclinations of the optical disc 28 in the radial direction thereof that is perpendicular to the tangential direction. The result is shown in FIG. 9. FIG. 10 shows results obtained on Example 6 in the form of a graph, and FIG. 11 shows results obtained on the comparative example in the form of a graph.

The results obtained on Example 1 indicate that flutter is reduced by providing the cover section 17c to cover the recess 16a3 compared to the comparative example. The results obtained on Examples 1 to 6 indicate that flutter is reduced by providing the projections 212 even when the recess 16a3 is not covered, compared to the comparative example. Further, it will be understood that flutter is reduced by providing the projections 212 continuously with the edge of the support member. Examples 4 and 5 show that a change in the length of the projections 212 inverted the reduction of flutter, i.e. inverted the inclination of the optical disc 28. This indicates that a proper length of the projections 212 resides in the range from 5 mm to 15 mm. Specifically, the results obtained on Examples 2 to 4 indicate that projections having a length of 10 mm and a width of 10 mm are preferable. Further, results obtained on Examples, 7, 8, 3 and 6 indicate that there is an appropriate value for the height to which the projections 212 project. Those experimental results indicate that the shape of Example 6 is most preferable among the configurations in which the projections 212 are provided. Further, the results obtained on Examples 1, 7 and 8 indicate that a further reduction of flutter can be achieved by providing the projections 212 while covering the recess 16a3.

[Advantages of Embodiments]

As described above, the rotor support member 17 substantially covers the tray recess 16a1 having the flat surface 16aa on which the optical disc 28 is set, from above and defines the substantially cylindrical housing space 18 for substantially coaxially housing the optical disc 28. The rotor support member 17 is provided with the cover section 17c, which covers the recess 16a3 located outside the flat surface 16aa at an interval smaller than the interval at which the opening 16a2 is covered. This makes it possible to suppress communication of air between the housing space 18 and the surroundings through the recess 16a3 caused by the rotation of the optical disc 28. As a result, flutter attributable to an airflow or a difference between pressures on both sides of the optical disc 28 can be reduced to allow the optical disc 28 to rotate with stability.

The projections 212 are provided on the rotor support member 210 which substantially covers the tray recess 16a1 having the flat surface 16aa on which the optical disc 28 is set, from above and defines the substantially cylindrical housing space 18 for substantially coaxially housing the optical disc 28, the projections 212 being provided such that their ends face at least a part of the outer circumferential edge of the optical disc 28 on the bottom surface of the rotor support member 210 defining the housing space 18 and opposing the optical disc 28. As a result, an airflow generated by the rotation of the optical disc 28 is directed to and sprayed on the optical disc 28 with the projections 212, and the airflow holds down optical disc to prevent it from being inclined due to flutter. Thus, flutter generated by an airflow or a difference between pressures on both sides of the optical disc 28 can be reduced. Even if flutters are generated, the periphery of the non-recording surface of the optical disc 28 abuts on the ends of the projections 212 as a result of an increase in the inclination of optical disc attributable to the flutter, and any further inclination of the optical disc 28 can be thereby prevented.

What is claimed is:

1. A disk device, comprising:
   a tray having a flat surface portion on which a disk-shaped recording medium is substantially set;
   a cover which substantially covers the flat surface portion to define a housing space for housing the disk-shaped recording medium;
   a rotation drive section for rotating the disk-shaped recording medium; and
   a data processing unit for recording data on the disk-shaped recording medium or reading data recorded thereon,
   wherein the tray has an opening for allowing the data processing unit to move along a recording surface of the disk-shaped recording medium,
   wherein the opening includes an inner opening located inside the flat surface portion and an outer opening located outside the flat surface portion, and
   wherein the cover includes a cover section, which covers the outer opening at an interval smaller than the interval at which the cover covers the inner opening.

2. The disk device according to claim 1, wherein the cover section covers the outer opening in proximity to a surface of the tray.

3. The disk device according to claim 1,
   wherein the data processing unit has a pickup for optically recording data on the disk-shaped recording medium or reading data recorded on the disk-shaped recording medium, and
   wherein the outer opening allows the pickup to move without contacting the tray even when the pickup is positioned in the vicinity of an outer periphery of the disk-shaped recording medium.

4. The disk device according to claim 1, wherein the cover is formed by press work of a metal plate such that the cover section projects substantially in the form of a tongue.

5. A disc device, comprising:
   a tray having a flat surface portion on which a disk-shaped recording medium is substantially set;
   a cover which substantially covers the flat surface portion to define a housing space for housing the disk-shaped recording medium;
   a rotation drive section for rotating the disk-shaped recording medium; and
   a data processing unit for recording data on the disk-shaped recording medium or reading data recorded thereon,
   wherein the tray has an opening for allowing the data processing unit to move along a recording surface of the disk-shaped recording medium,
   wherein the opening includes an inner opening located inside the flat surface portion and an outer opening located outside the flat surface portion, and
   wherein the cover includes a projection projecting from a surface thereof opposing the disk-shaped recording medium housed in the housing space, the end of the projection opposing at least a part of an outer circumferential edge of the disk-shaped recording medium.

6. The disk device according to claim 5, wherein a plurality of the projections are provided in positions which are point-symmetrical about the center of the disk-shaped recording medium housed in the housing space.

7. The disk device according to claim 5, wherein a line connecting the projections to each other extends across the direction in which the opening expends.

8. The disk device according to claim 5, wherein the projection is bulged integrally on the surface of the cover opposing the disk-shaped recording medium.

9. The disk device according to claim 5, wherein the cover is a support member for supporting one of a pair of clamping sections of the rotation drive section which clamps the disk-shaped recording medium in the axial direction thereof.

10. The disk device according to claim 1, wherein the cover is a support member for supporting one of a pair of clamping sections of the rotation drive section which clamps the disk-shaped recording medium in the axial direction thereof.

* * * * *